（12) United States Patent
Nagai et al.

(10) Patent No.: US 9,768,673 B2
(45) Date of Patent: Sep. 19, 2017

(54) METHOD OF MANUFACTURING LAMINATED ROTOR CORE

(71) Applicant: MITSUI HIGH-TEC, INC., Kitakyushu-shi, Fukuoka (JP)

(72) Inventors: Akira Nagai, Kitakyushu (JP); Go Kato, Kitakyushu (JP); Mei Ogata, Kitakyushu (JP)

(73) Assignee: MITSUI HIGH-TEC, INC., Kitakyushu-shi (JP)

(*) Notice: Subject to any disclaimer, the term of this patent is extended or adjusted under 35 U.S.C. 154(b) by 562 days.

(21) Appl. No.: 14/152,014

(22) Filed: Jan. 10, 2014

(65) Prior Publication Data

US 2014/0196276 A1    Jul. 17, 2014

(30) Foreign Application Priority Data

Jan. 15, 2013  (JP) .................. 2013-004704

(51) Int. Cl.
*H02K 15/03* (2006.01)
*H02K 15/12* (2006.01)

(52) U.S. Cl.
CPC ............. *H02K 15/03* (2013.01); *H02K 15/12* (2013.01); *Y10T 29/49012* (2015.01)

(58) Field of Classification Search
CPC .......... B65G 17/32; B65G 17/46; H02K 1/27; H02K 1/28; H02K 15/02; B23Q 5/28; Y10T 29/49012
See application file for complete search history.

(56) References Cited

U.S. PATENT DOCUMENTS

| 5,990,588 | A * | 11/1999 | Kliman | .................. | H02K 3/493 |
| | | | | | 310/86 |
| 8,991,035 | B2 * | 3/2015 | Sasaki | ............... | B29C 45/14065 |
| | | | | | 29/596 |
| 2006/0220483 | A1 * | 10/2006 | Jones | ..................... | H02K 1/278 |
| | | | | | 310/156.19 |
| 2008/0093945 | A1 * | 4/2008 | Gruenhagen | .......... | H02K 1/278 |
| | | | | | 310/156.19 |
| 2008/0238219 | A1 * | 10/2008 | Hoshino | ................ | H02K 1/274 |
| | | | | | 310/400 |

(Continued)

FOREIGN PATENT DOCUMENTS

| CN | 1312606 A | 9/2001 |
| CN | 101356711 A | 1/2009 |

(Continued)

OTHER PUBLICATIONS

Office Action dated Nov. 12, 2015, issued in counterpart Chinese Patent Application No. 201410014706.3, with English translation. (14 pages).

(Continued)

*Primary Examiner* — Carl Arbes
(74) *Attorney, Agent, or Firm* — Westerman, Hattori, Daniels & Adrian, LLP

(57) ABSTRACT

There is provided a method of manufacturing a laminated rotor core, including: a mounting step of placing a core body on a carrier tray, the core body having a plurality of magnet insertion holes provided around the shaft hole, the carrier tray having a mount plate and a columnar guide member standing on a front surface of the mount plate 41, the placement of the core body being carried out by fitting the guide member into the shaft hole; an inserting step of inserting permanent magnets respectively in the magnet insertion holes; an injecting step of injecting a liquefied resin material in each of the magnet insertion holes; and a first preheating step of heating the core body before the mounting step, wherein the inserting step and the injecting step are carried out in a state in which the core body is placed on the carrier tray.

16 Claims, 8 Drawing Sheets

(56) References Cited

U.S. PATENT DOCUMENTS

| | | | |
|---|---|---|---|
| 2008/0276446 A1* | 11/2008 | Amano | B29C 45/02 |
| | | | 29/598 |
| 2009/0189309 A1* | 7/2009 | Matsubayashi | H02K 15/12 |
| | | | 264/263 |
| 2010/0314215 A1* | 12/2010 | Fischer | H02K 41/033 |
| | | | 198/343.1 |
| 2011/0227441 A1* | 9/2011 | Ifrim | H02K 1/2773 |
| | | | 310/156.19 |
| 2012/0098271 A1* | 4/2012 | Bayer | H01F 7/0221 |
| | | | 290/55 |
| 2012/0222289 A1 | 9/2012 | Nagai et al. | |
| 2012/0313463 A1* | 12/2012 | Howell | H02K 15/03 |
| | | | 310/43 |
| 2012/0324719 A1* | 12/2012 | Sasaki | B29C 45/14065 |
| | | | 29/598 |

FOREIGN PATENT DOCUMENTS

| | | |
|---|---|---|
| CN | 102598490 A | 7/2012 |
| EP | 0 712 198 A1 | 5/1996 |
| JP | 9182333 A * | 7/1997 |
| JP | 9200982 A * | 7/1997 |
| JP | H10-42512 A | 2/1998 |
| JP | 11262205 A * | 9/1999 |
| JP | 2006-204068 A | 8/2006 |
| JP | 2006246560 A * | 9/2006 |
| JP | 2007-282358 A | 10/2007 |
| JP | 2008-42967 A | 2/2008 |
| JP | 2012-10595 A | 1/2012 |
| JP | 2012-210148 A | 10/2012 |
| JP | 2012-235692 A | 11/2012 |

OTHER PUBLICATIONS

Notice of Reasons for Refusal dated Aug. 2, 2016, issued in Japanese Patent Application No. 2013-004704, with English translation (6 pages).

Final Notification of Reasons for Refusal dated Jan. 4, 2017, issued in Japanese Patent Application No. 2013-004704, with English translation (8 pages).

* cited by examiner

FIG. 2(A-1)
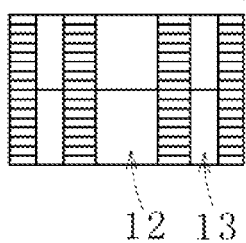
FIG. 2(B-1)
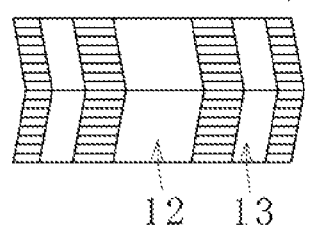
FIG. 2(A-2)
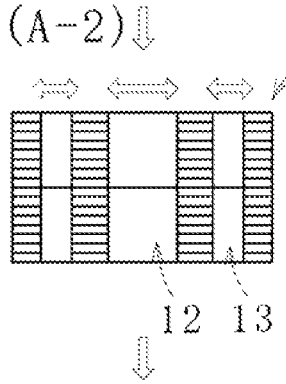
FIG. 2(B-2)
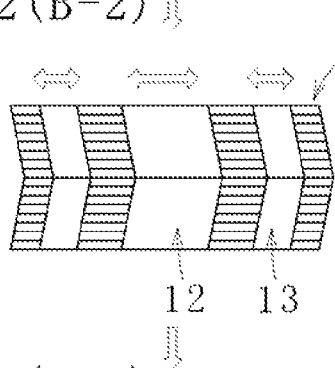
FIG. 2(A-3)
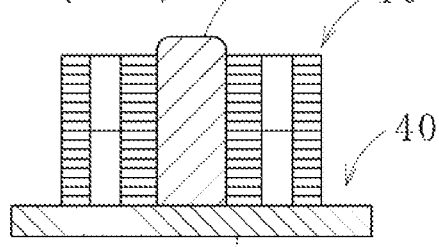
FIG. 2(B-3)
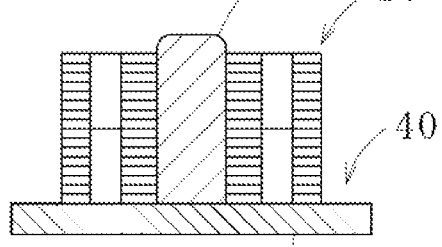
FIG. 2(A-4)
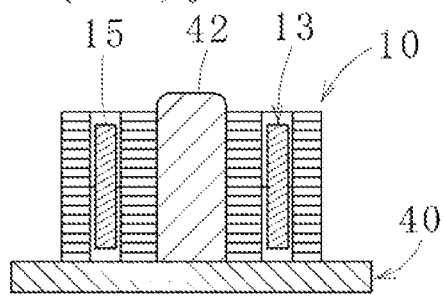
FIG. 2(B-4)
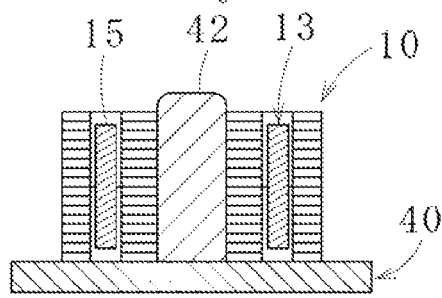

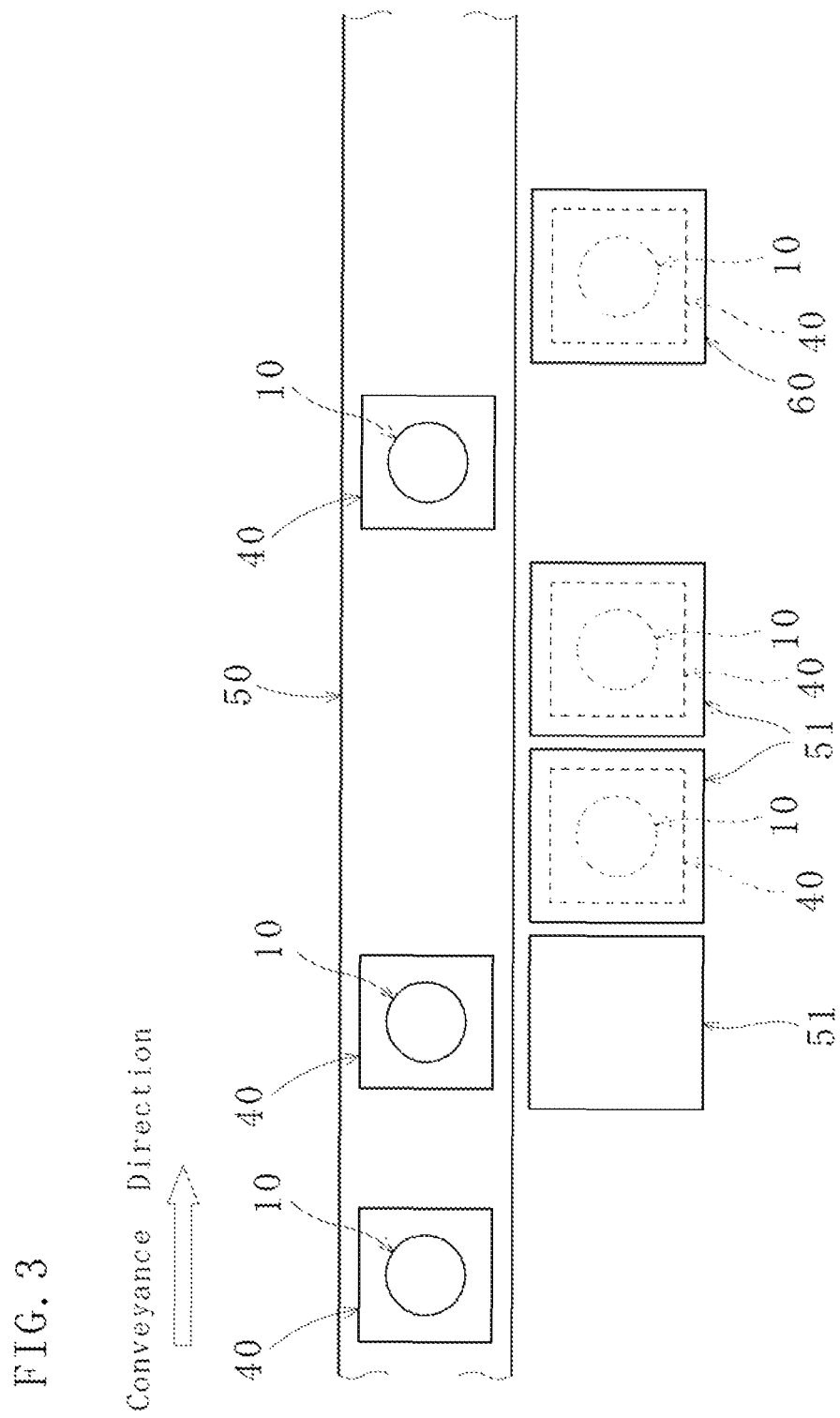

PRIOR ART

METHOD OF MANUFACTURING LAMINATED ROTOR CORE

FIELD OF THE INVENTION

The present invention relates to a method of manufacturing a laminated rotor core by sealing permanent magnets respectively inserted in a plurality of magnet insertion holes provided along a circumferential direction with a resin material.

BACKGROUND OF THE INVENTION

As a rotor used for an electric motor, a laminated rotor core has been widely spread in which permanent magnets are inserted in magnet insertion holes in a core body having a plurality of core sheets that are laminated, and the permanent magnets are fixed (sealed) by a resin material. The fixation of the permanent magnets is performed by injecting a liquefied thermosetting resin (resin material) into the magnet insertion holes in which the permanent magnets are inserted while applying pressure to the core body in a laminating direction, and by curing the resin material by heating. At this time, in order to improve workability, handling properties, and the like, there is known a method of inserting the permanent magnets in the magnet insertion holes while the core body is placed on a carrier tray, setting the core body placed on the carrier tray within a resin sealing mold, and injecting the resin material. Referring to FIG. 8, a carrier tray 40 includes a mount plate 41, and a columnar guide member 42 standing on a front surface of the mount plate 41. A core body 10 is placed on the carrier tray 40 by fitting the guide member 42 in a shaft hole 12 of the core body 10 (see Patent Document 1: JP 2008-42967 A and Patent Document 2: JP 2012-10595 A). As described above, by fitting the guide member 42 in the shaft hole 12 when the core body 10 is placed on the carrier tray 40, it is considered that centering of a plurality of core sheets may be facilitated, and productivity and such may be improved.

CITATION LIST

Patent Document

Patent Document 1: JP 2008-42967 A
Patent Document 2: JP 2012-10595 A

SUMMARY OF THE INVENTION

Technical Problem

As described above, when the guide member 42 is fitted in the shaft hole 12, the fitting is smoothly performed by providing a minor gap (e.g., about 10 μm) between the guide member 42 and the shaft hole 12. However, there is a case in which accuracy of straightness and squareness of the shaft hole 12 is not sufficiently obtained and the gap is less than the set value due to thickness deviation of the material used for the core body 10, press-cutting accuracy and caulk-coupling of the core sheets. In this case, as illustrated in FIG. 8, the guide member 42 of the carrier tray 40 is not easily or at all inserted into the shaft hole 12 of the core body 10.

Further, after injection of a resin material, the carrier tray 40 is heated along with the core body 10 in order to cure the resin material. Then, the core body 10 is removed after being cooled, and the carrier tray 40 is used to place the core body 10 that comes next. In this manner, the carrier tray 40 is used repeatedly in the steps of heating and cooling, and there is a case, depending on a cycle time of the production line, in which the carrier tray 40 is not cooled down to room temperature after the cooling and the guide member 42 remains expanded due to thermal expansion. In this case, the gap between the shaft hole 12 and the guide member 42 is reduced, or a diameter of the guide member 42 may even increase to be greater than a diameter of the shaft hole 12. Therefore, it is more likely to occur the case in which the guide member 42 is not easily or at all inserted into the shaft hole 12.

As described above, when the guide member 42 is not easily or at all inserted into the shaft hole 12, it takes additionally longer time to attempt to forcibly insert the guide member 42 into the shaft hole 12. Further, the core body 10 may be damaged or deformed as a result of the forcible insertion or the attempt of the forcible insertion, and this is one of the factors of quality reduction of the obtained laminated rotor core.

The present invention is made in view of the above problems, and an object of the present invention is to provide a method of manufacturing a laminated rotor core capable of smoothly fitting a guide member of a carrier tray into a shaft hole, suppressing quality reduction of an obtained laminated rotor core, and improving productivity.

Solution to Problem

A method of manufacturing a laminated rotor core according to the present invention meeting the above object includes: a mounting step of placing a core body on a carrier tray, the core body having a plurality of core sheets that are laminated on each other and having a shaft hole provided in the center of the core body and a plurality of magnet insertion holes provided around the shaft hole, the carrier tray having a mount plate and a columnar guide member standing on a front surface of the mount plate, the placement of the core body being carried out by fitting the guide member into the shaft hole; an inserting step of inserting permanent magnets (including one that is not magnetized; the same applies in the following) respectively in the magnet insertion holes; an injecting step of injecting a liquefied resin material in each of the magnet insertion holes; and a first preheating step of heating the core body before the mounting step, wherein the mounting step, the inserting step, and the injecting step are carried out in the stated order, and the inserting step and the injecting step are carried out in a state in which the core body is placed on the carrier tray.

According to the method of manufacturing a laminated rotor core of the present invention, as the first preheating step of heating the core body is included before the mounting step, a diameter of the shaft hole is increased in the mounting step, and it is possible to smoothly fit the guide member into the shaft hole. Therefore, according to the method of manufacturing a laminated rotor core of the present invention, quality reduction of the obtained laminated rotor core may be suppressed, and productivity is improved.

According to the method of manufacturing a laminated rotor core of the present invention, it is preferable that in the mounting step, a temperature of the core body is equal to or higher than that of the carrier tray. By setting the temperature of the core body to be equal to or higher than that of the carrier tray in the mounting step, it is possible to sufficiently expand the diameter of the shaft hole of the core body, and to fit the guide member more smoothly.

According to the method of manufacturing a laminated rotor core of the present invention, it is preferable that in the inserting step, a temperature of the core body is equal to or higher than that of the permanent magnets. By maintaining the temperature of the core body to be equal to or higher than that of the permanent magnets in the inserting step in this manner, it is possible to maintain the diameter of the magnet insertion holes to be expanded and to smoothly insert the permanent magnets.

Preferably, the method of manufacturing a laminated rotor core according to the present invention further includes a second preheating step of heating the core body between the inserting step and the injecting step. If the temperature of the core body is low in the injecting step, flowability of the resin material is reduced, and the injection and the curing after the injection become difficult. Therefore, by heating the permanent magnets that have been inserted and the core body in the second preheating step, it is possible to suppress reduction of flowability of the resin material in the injecting step, and to efficiently perform the injection. Further, according to the method of manufacturing a rotor of the present invention, as the core body is heated to some extent in the first preheating step, it is possible to reduce time and energy in the second preheating step.

Preferably, the method of manufacturing a laminated rotor core according to the present invention further comprises: a curing step of curing the resin material injected into the magnet insertion holes by heating the resin material; and a cooling step of cooling the carrier tray after the curing step, wherein the carrier tray cooled in the cooling step is repeatedly used. In the case in which the carrier tray is used repeatedly after the cooling step in this manner, even if a cycle time of the production line is short and the carrier tray is not cooled down to room temperature, it is possible to smoothly perform the placement (fitting) and to improve productivity as the core body is heated to increase the diameter of the shaft hole. Further, it is possible to reduce the cycle time of the production line.

According to the method of manufacturing a laminated rotor core of the present invention, it is preferable that the core body is constituted of a plurality of blocks divided in a laminating direction. When the core body is constituted of the plurality of blocks, it is possible to fit the guide member even when squareness of the blocks with respect to the guide member is poor, and to improve squareness by the pressure applied in the injecting step. Further, by laminating the plurality of blocks using the guide member on the basis of an inner diameter, accuracy of the shaft hole excels as the laminated rotor core and accuracy in attachment of a rotation shaft (shaft) is improved.

According to the method of manufacturing a laminated rotor core of the present invention, it is preferable that one of a heating furnace, a band heater, a rubber heater, induction heating, and a hot plate is used for heating in the first preheating step. By using any of these heating devices, it is possible to efficiently heat the core body.

According to the method of manufacturing a laminated rotor core of the present invention, it is preferable that the hot plate and a preheating fixture placed on the hot plate are used for heating in the first preheating step, the preheating fixture includes a mounting table for placing the core body, and a column portion extending higher than a front surface of the mounting table and to be inserted into the shaft hole of the core body, the core body is in a columnar shape, and a distance from the center of the column portion to an outer edge on the front surface of the mounting table is smaller than a radius of the core body. In the first preheating step, by placing such a preheating fixture on the hot plate and placing the core body on the preheating fixture, it is possible to facilitate the placement and removal of the core body on and from the preheating fixture, and to further improve productivity and such.

According to the method of manufacturing a laminated rotor core of the present invention, it is preferable that the guide member and the mount plate of the carrier tray are provided in a separable manner. By configuring the carrier tray such that the guide member and the mount plate are separable, the guide member may be directly used as the shaft of the laminated rotor core without removing the guide member.

Advantageous Effects of Invention

According to the method of manufacturing a laminated rotor core of the present invention, the guide member of the carrier tray may be smoothly fitted into the shaft hole, quality reduction of the obtained laminated rotor core may be suppressed, and productivity is improved.

BRIEF DESCRIPTION OF THE DRAWINGS

FIG. 2A-1 and FIG. 2B-1 are schematic sectional views of each core body before the first preheating step, FIG. 2A-2 and FIG. 2B-2 are schematic sectional views of each core body after the first preheating step, FIG. 2A-3 and FIG. 2B-3 are schematic sectional views of each core body and a carrier tray after a mounting step, and FIG. 2A-4 and FIG. 2B-4 are schematic sectional views of each core body and the carrier tray after an inserting step, in the method of manufacturing a laminated rotor core according to the one embodiment of the present invention;

FIG. 3 is an illustrative view of a flow from a second preheating step to the injecting step in the method of manufacturing a laminated rotor core according to the one embodiment of the present invention;

FIG. 4 is an illustrative view of a preheating device used in the second preheating step in the method of manufacturing a laminated rotor core according to the one embodiment of the present invention;

DETAILED DESCRIPTION OF THE INVENTION

Hereinafter, a specific embodiment of the present invention will be described with reference to the accompanying drawings. A method of manufacturing a laminated rotor core according to one embodiment of the present invention includes a first preheating step, a mounting step, an inserting step, a second preheating step, an injecting step, a curing step, and a cooling step. In the following description, these steps will be described one by one.

(First Preheating Step)

Figure 1A:
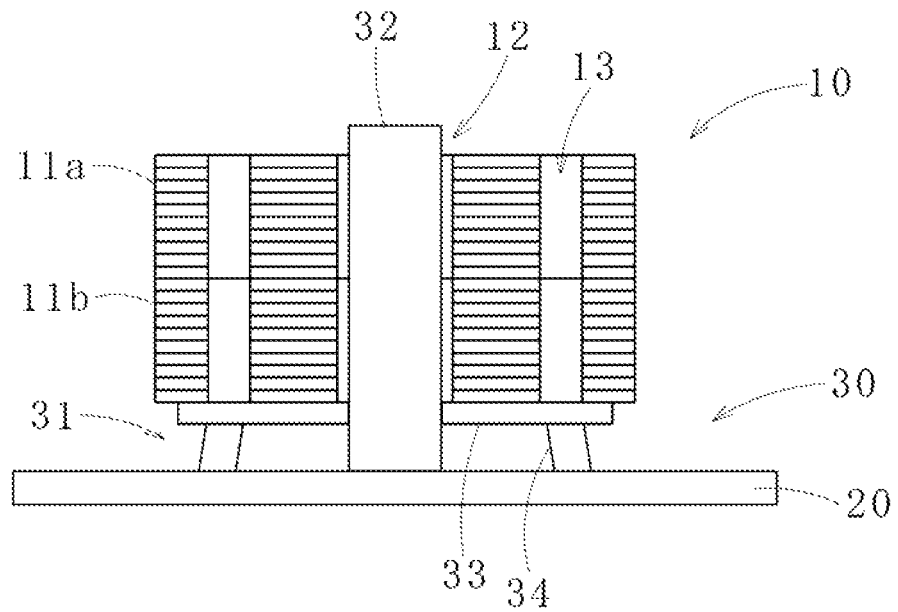
FIG. 1A and FIG. 1B are a schematic sectional view and a schematic plan view of a core body and a preheating device in a first preheating step in a method of manufacturing a laminated rotor core according to one embodiment of the present invention.
Figure 1B:
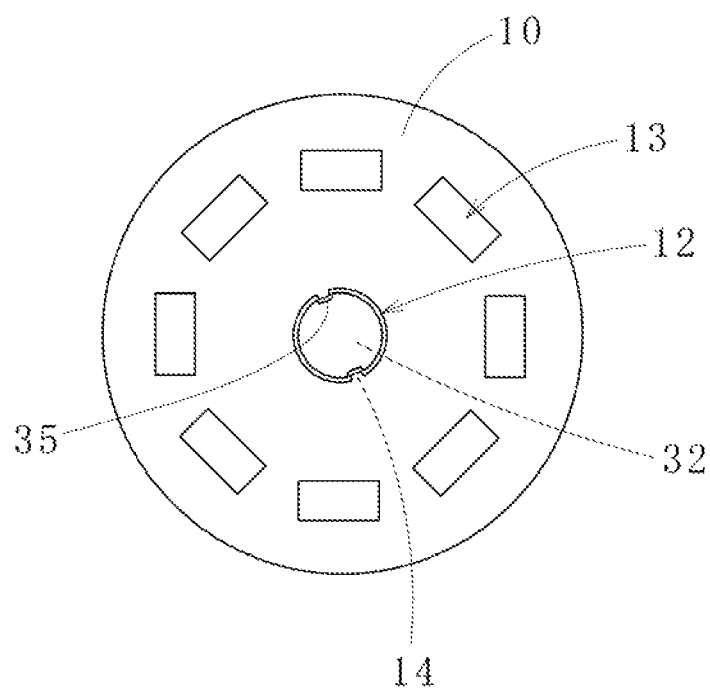

In this step, as illustrated in FIGS. 1A and 1B, a core body 10 is heated (preheated) using a hot plate 20 and a preheating fixture 30. The hot plate 20 and the preheating fixture 30 constitute a preheating device.

The core body 10 is configured by a lamination of a plurality of core sheets. The core body 10 includes a plurality of (here, two) blocks 11a and 11b that are divided in a laminating direction. In other words, each of the blocks 11a and 11b is also a laminated body of plurality of core sheets. Here, the plurality of laminated core sheets is fixed to each other by caulking or welding, for example.

The core body 10 is in a columnar shape, and includes a circular columnar shaft hole 12 provided in the center along an axial direction, and a plurality of (here, eight) square columnar magnet insertion holes 13 provided around the shaft hole 12. The eight magnet insertion holes 13 are disposed concyclically at substantial regular intervals, and each hole has a magnetic pole radially outward by a permanent magnet 15 (see FIG. 2) disposed therein. The present invention is also applied to a case in which there is more than one magnet insertion hole having the same magnetic pole.

As the hot plate 20, any known hot plate may be used without limitation as long as it is possible to heat up to a desired temperature. The hot plate 20 heats the core body 10 with the preheating fixture 30 interposed therebetween. It is also possible to provide the preheating fixture with a heating function, and to heat only by the preheating fixture.

The preheating fixture 30 is used while being placed on the hot plate 20. The preheating fixture 30 is made of metal, and provided with a mounting table 31 for placing the core body 10 and a column portion 32. The mounting table 31 has a disc plate 33 and a plurality of leg portions 34 that support the disc plate 33 from the back side. The column portion 32 stands to penetrate through the center of the disc plate 33 and extend upward from a front surface of the disc plate 33 (the mounting table 31). The height of the column portion 32 is set so as to be higher than the height of the core body 10 (the position of the front surface) when the core body 10 is placed. Further, a pair of grooved portions 35 are provided in a height direction on a side surface of the column portion 32 so as to correspond to a pair of elongated and protruded baffles (keys) 14 provided within the shaft hole 12 of the core body 10 in the axial direction.

The core body 10 is placed on the preheating fixture 30 (the mounting table 31) by inserting the column portion 32 of the preheating fixture 30 into the shaft hole 12 of the core body 10 in a state in which the preheating fixture 30 is placed on the hot plate 20. At this time, a distance from the center of the column portion 32 to an outer edge on the front surface of the mounting table 31 (the disc plate 33), that is, a radius of the disc plate 33, is smaller than a radius of the core body 10. In this manner, by using the preheating fixture 30 having the mounting table 31 whose radius is smaller than that of the core body 10, it is possible to facilitate placement and removal of the core body 10 on and from the preheating fixture 30. Specifically, if the core body 10 is directly placed on the hot plate 20, it is necessary to hold only the side surface of the core body 10 in order to hold the core body 10 without touching the hot plate 20, resulting in poor workability. However, by placing the core body 10 on the preheating fixture 30 in this manner, it is possible to easily hold the core body 10 by placing the finger in the edge of its bottom.

Further, the disc plate 33 of the mounting table 31 may have one or a plurality of through-holes, or a curved portion that is cut from an outer edge into the center. With such a configuration, when the core body 10 is removed from the mounting table 31, the core body 10 may be brought up from the bottom by placing the finger in the through-hole and the curved portion, and it is possible to improve removability (workability).

As described above, in the first preheating step, the core body 10 is heated by the hot plate 20 with the preheating fixture 30 interposed therebetween. Through this step, diameters of the shaft hole 12 and the magnet insertion hole 13 of the core body 10 increase (see FIGS. 2A-1 and 2A-2).

Further, by preheating the core body 10 configured by the two blocks 11a and 11b in this manner using the preheating fixture 30, centering is performed by the column portion 32, and placement on a carrier tray 40 in the next mounting step (fitting of a guide member 42 into the shaft hole 12) is facilitated. In addition, it is possible to correct the core body 10 (the blocks 11a and 11b) with poor straightness and squareness.

A heating temperature of the core body 10 in the first preheating step is not particularly limited as long as the diameter of the shaft hole 12 of the core body 10 sufficiently increases, and can be no lower than 50° C. and no higher than 200° C., for example. There is a case in which the diameter may not sufficiently increase if the heating temperature is lower than 50° C., and productivity may decrease if the heating temperature is above 200° C. because time and energy required for heating increase. Further, as will be described later, the heating temperature of the core body 10 may preferably be determined according to a temperature relative to the carrier tray 40.

The heating in the first preheating step may also be performed by directly placing the core body 10 on the hot plate 20. The direct placement may improve the heat efficiency. Further, by heating the core body 10 from one surface (lower surface) by the hot plate 20 directly or via the preheating fixture 30, it is possible to preferentially increase the diameter of the shaft hole 12 on a side (lower side) from which the guide member 42 of the carrier tray 40 (see FIG. 2A-3) is inserted. In this manner, the fitting may be smoothly performed even if the core body 10 as a whole is not evenly and sufficiently heated, as the shaft hole 12 on the side for insertion is increased to some extent. In addition, this may reduce time for heating and such.

Moreover, the heating in the first preheating step may be performed using a heating device other than the hot plate. Examples of other heating devices include a heating furnace, a band heater, a rubber heater, and the like. As the heating furnace, the band heater, and the rubber heater, those well-known may be used.

(Mounting Step)

In this step, as illustrated in FIG. 2A-3, the core body 10 heated in the first preheating step is placed on the carrier tray 40. The carrier tray 40 includes a mount plate 41 and the guide member 42 in a circular columnar or a pipe shape and standing in the center on a front surface of the mount plate 41. The guide member 42 and the mount plate 41 are configured in a separable manner. The core body 10 is placed on the carrier tray 40 by fitting the guide member 42 into the shaft hole 12, such that a bottom surface of the core body 10 is in contact with the front surface of the mount plate 41.

A diameter of the guide member 42 is set to have a slight difference (gap) with the diameter of the shaft hole 12 of the core body 10 at the same temperature (e.g., 20° C.). The difference between the diameter of the guide member 42 and the diameter of the shaft hole 12 is for example, about no smaller than 0.1 μm and no greater than 30 μm, and preferably no smaller than 10 μm and no greater than 20 μm. If the difference is too small, workability of fitting and removal may decrease, and if the difference is too large, workability of the injecting step and the like may possibly decrease by the occurrence of rattling.

In the placement, as the diameter of the shaft hole 12 of the core body 10 is increased due to the heating in the first preheating step, the gap is increased (see FIG. 2A-2), and it is possible to smoothly fit the guide member 42 into the shaft hole 12 (see FIG. 2A-3). Further, as will be described later, the carrier tray 40 is used repeatedly in the steps of heating and cooling, and if the cooling is insufficient, there is a case in which the gap becomes smaller or eliminated as the guide member 42 is used while the guide member 42 remains expanded, and the guide member 42 may not be fitted into the shaft hole 12 smoothly. However, by performing the first preheating step before the mounting step as in this embodiment, it is possible to ensure a sufficient gap even when the guide member 42 of the carrier tray 40 is expanded to some extent to allow smooth fitting.

Further, as illustrated in FIGS. 2B-1 to 2B-2, even if accuracy of straightness and squareness of the shaft hole 12 (and the magnet insertion holes 13) of the core body 10 is poor, it is possible to expand the diameters of the holes 12 and 13 through the first preheating step using the preheating fixture 30, and the guide member 42 may be fitted as illustrated in FIG. 2B-3.

In the mounting step, it is preferable that the temperature of the core body 10 is equal to or higher than that of the carrier tray 40. By setting the temperature of the core body 10 in the mounting step to be equal to or higher than that of the carrier tray 40, it is possible to sufficiently expand the diameter of the shaft hole 12 of the core body 10, and to fit the guide member 42 into the shaft hole 12 more smoothly. The temperature difference (the temperature of the core body 10—the temperature of the carrier tray 40) may be no smaller than 0° C., and preferably no larger than 20° C. A linear expansion coefficient of the core body 10 (iron) is known to be $11.76 \times 10^{-6}/°C$. Therefore, when heating such that a temperature difference is 10° C. is performed, the shaft hole 12 whose diameter is 10 cm is sufficiently expanded by about 12 μm. The diameter is further expanded as the temperature difference is larger and fitting of the guide member 42 is facilitated, however, if the gap is too large, the core body 10 becomes shaky and must wait before going into a production line. Therefore, the smaller the temperature difference is, the smaller an influence given to the productivity.

(Inserting Step)

In this step, as illustrated in FIGS. 2A-4 and 2B-4, the permanent magnets 15 are inserted into the respective magnet insertion holes 13 of the core body 10 placed on the carrier tray 40. The permanent magnets 15 that are to be inserted are in a substantial rectangular columnar shape that is slightly smaller than the magnet insertion holes 13. Further, the length of the permanent magnets 15 is slightly shorter than the depth of the magnet insertion holes 13, so that the permanent magnets 15 are contained within the magnet insertion holes 13. After this step, confirmation of whether or not the respective permanent magnets are inserted into the magnet insertion holes 13 may be carried out by a magnet detector.

Also in the inserting step, it is preferable that the temperature of the core body 10 is higher than that of the permanent magnets 15. By setting the temperature of the core body 10 to be higher than that of the permanent magnets 15 that are to be inserted in the inserting step in this manner, it is possible to maintain the diameter of the magnet insertion holes 13 to be expanded and to smoothly insert the permanent magnets 15. The temperature difference (the temperature of the core body 10—the temperature of the permanent magnets 15) may be no smaller than 0° C., and preferably no larger than 20° C.

While the permanent magnets 15 that are to be inserted may be at room temperature, it is possible to improve facility of the insertion by using the permanent magnets 15 that are cooled down below or equal to room temperature. Conversely, by using the permanent magnet 15 that are heated above or equal to room temperature, it is possible to reduce or eliminate heating time in the following second preheating step, and to improve facility of the injection of a resin material 16.

(Second Preheating Step)

In this step, the core body 10 in which the permanent magnets 15 have been inserted is heated again. As illustrated in FIG. 3, for example, the carrier tray 40 on which the core body 10 is placed is carried along a carrier rail 50 to a position near a preheating device 51, the core body 10 and the carrier tray 40 are put into the preheating device 51, and the core body 10 is heated (preheated) up to a melting temperature of the resin material 16 to be injected (see FIG. 5).

Specifically, the core body 10 that has been carried along the carrier rail 50 is put in one of a plurality (here, three) of the preheating devices 51 disposed on the side of the carrier rail 50. Then, after the core body 10 is preheated within the preheating device 51 up to the melting temperature of the resin material 16, the core body 10 that has been preheated and the carrier tray 40 are taken out of the preheating device 51, and carried for the next step.

Examples of the resin material 16 to be used include a thermosetting resin such as an epoxy resin containing an adequate amount of filler that is conventionally used as a sealing material and the like for semiconductors. In a case in which an epoxy resin is used as the resin material 16, as a melting temperature of the epoxy resin before the curing (cross-link) is for example, about 170° C., it is possible to set a preheating temperature of the core body 10 to be about 170° C. (e.g., 170±10 to 20° C.). The preheating temperature may be suitably adjusted depending on conditions such as the melting temperature of the resin material 16. Further, a number n of the preheating devices 51 (a stage for preheating the core body 10) is desirably an integer (e.g., 2 to 6) that does not exceed (T2/T1), where T1 is an entire processing time of a resin sealing device 60 that will be described later and T2 is an entire processing time of the preheating device 51. With this, it is possible to efficiently operate the preheating device 51 and the resin sealing device 60.

Figure 4:
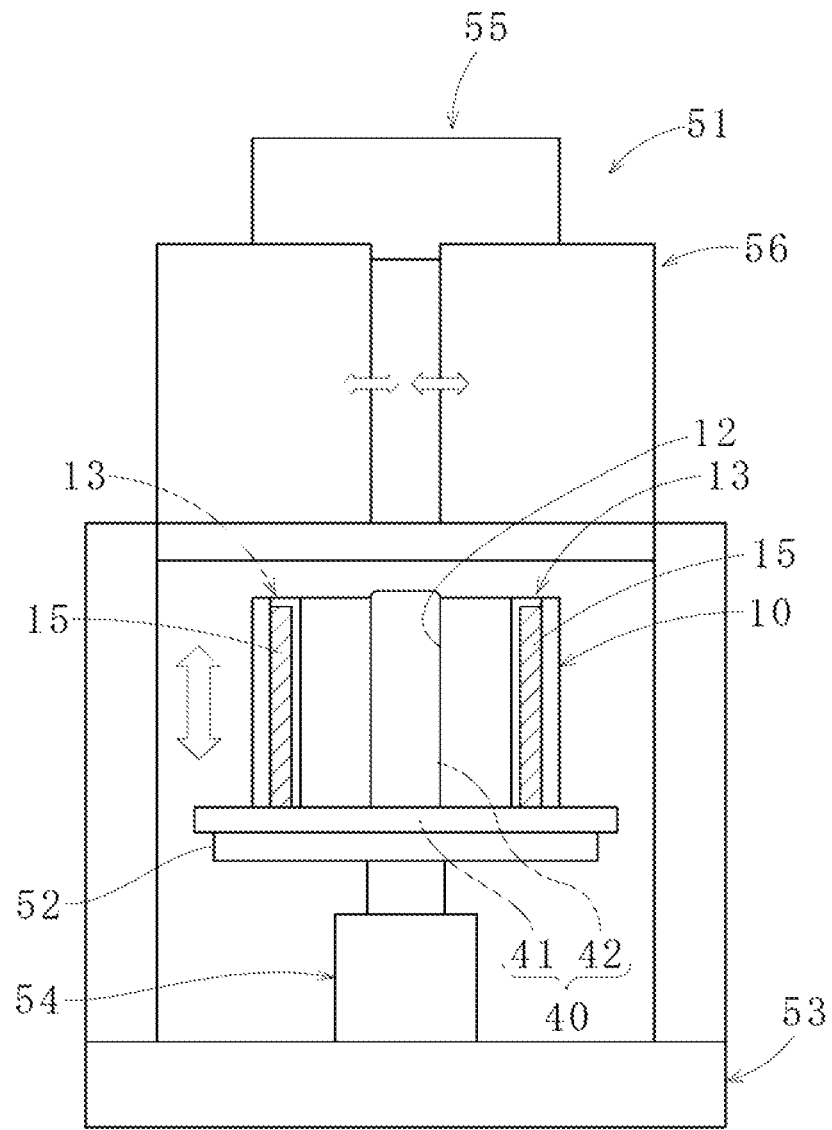

As illustrated in FIG. 4, for example, the preheating device 51 includes a lower heating part 52 for placing the carrier tray 40 thereon, and a lifting device (e.g., jack) 54 provided on a fixing frame 53 in order to move the lower heating part 52 up and down. The preheating device 51 is also includes an upper heating part 55 positioned above the core body 10 when the core body 10 is lifted up to an upper limit position by the lifting device 54, and a side heating part 56 that surrounds the core body 10 from the side. As illustrated in FIG. 4, the side heating part 56 is divided into two parts which are moved laterally, and can be opened and closed by moving these parts horizontally centering the core body 10 to facilitate setting and taking out of the core body 10.

Each of the heating parts 52, 55, and 56 provided in the preheating device 51 has an electric heater, and the core body 10 is heated by the electric heaters. However, the core body 10 may be heated by induction heating or hot-air heating, or by a combination of two or more of heating by electric heaters, induction heating, and hot-air heating.

While the case in which a plurality of preheating devices 51 are disposed has been described, it is possible to use only one preheating device 51. In this case, it is preferable that the preheating device 51 have a capacity enough to contain more than one core body 10. Further, it is possible to provide a tunnel-type preheating device on the carrier rail 50, and to preheat the core body 10 within the preheating device while carrying the carrier tray 40 on which the core body 10 is placed along the carrier rail 50. Moreover, while the second preheating step is performed after the inserting step (in a state in which the permanent magnets 15 have been inserted into the respective magnet insertion holes 13), the second preheating step may be performed before the inserting step (in a state in which the permanent magnets 15 are not inserted into the magnet insertion holes 13), and the permanent magnets 15 may be inserted into the magnet insertion holes 13 after the second preheating step.

(Injecting Step)

In this step, the liquefied resin material 16 is injected into each magnet insertion hole 13, and the permanent magnet 15 that has been inserted into the magnet insertion hole 13 is sealed. This is performed by, as illustrated in FIG. 3, for example, carrying the carrier tray 40 and the core body 10 taken out of the preheating device 51 after the preheating (second preheating step) has been completed along the carrier rail 50 to the resin sealing device 60, and placing the core body 10 and the carrier tray 40 on the resin sealing device 60.

Figure 5:
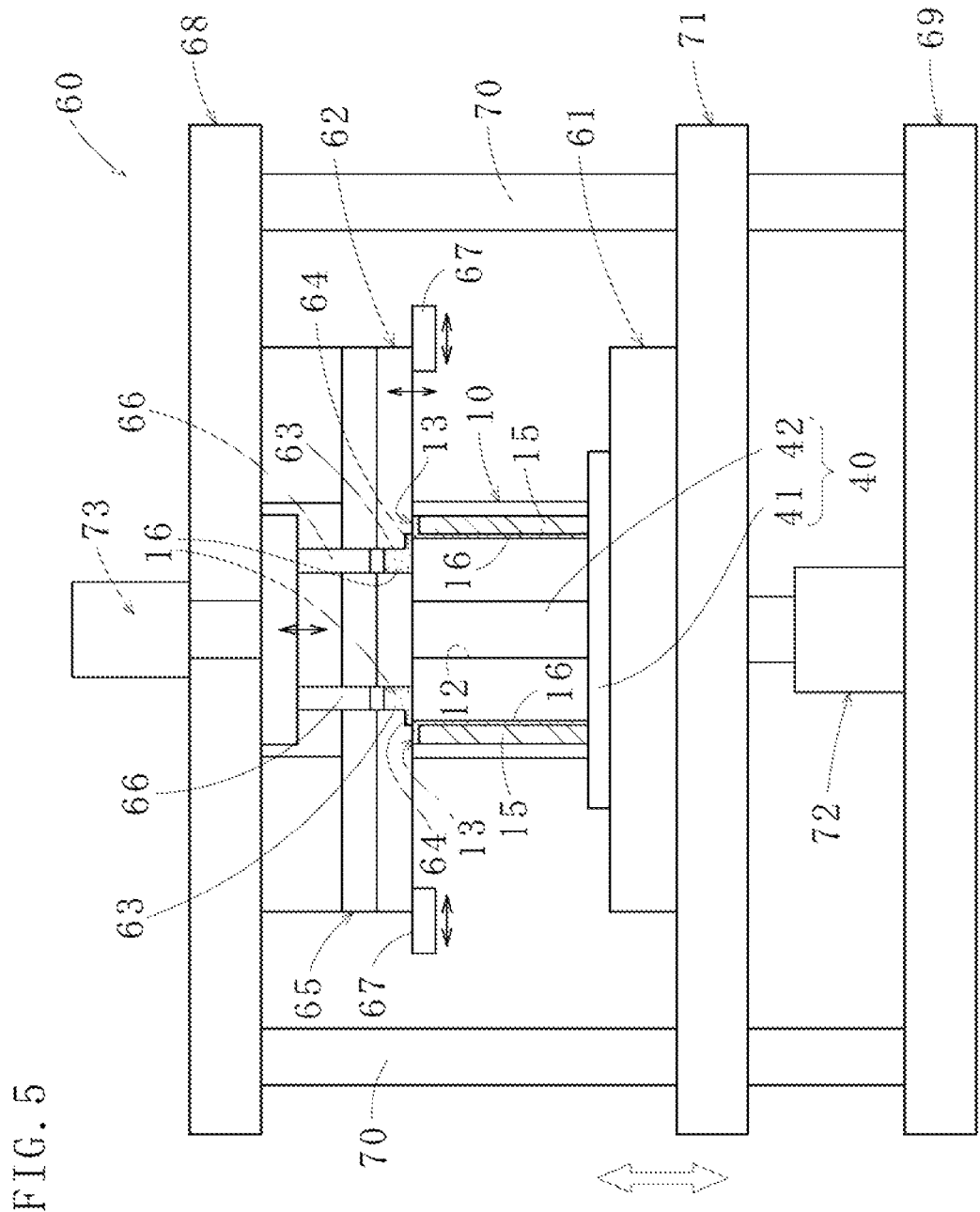
FIG. 5 is an illustrative view of a resin sealing device used in the injecting step and the like in the method of manufacturing a laminated rotor core according to the one embodiment of the present invention.
Figure 6:
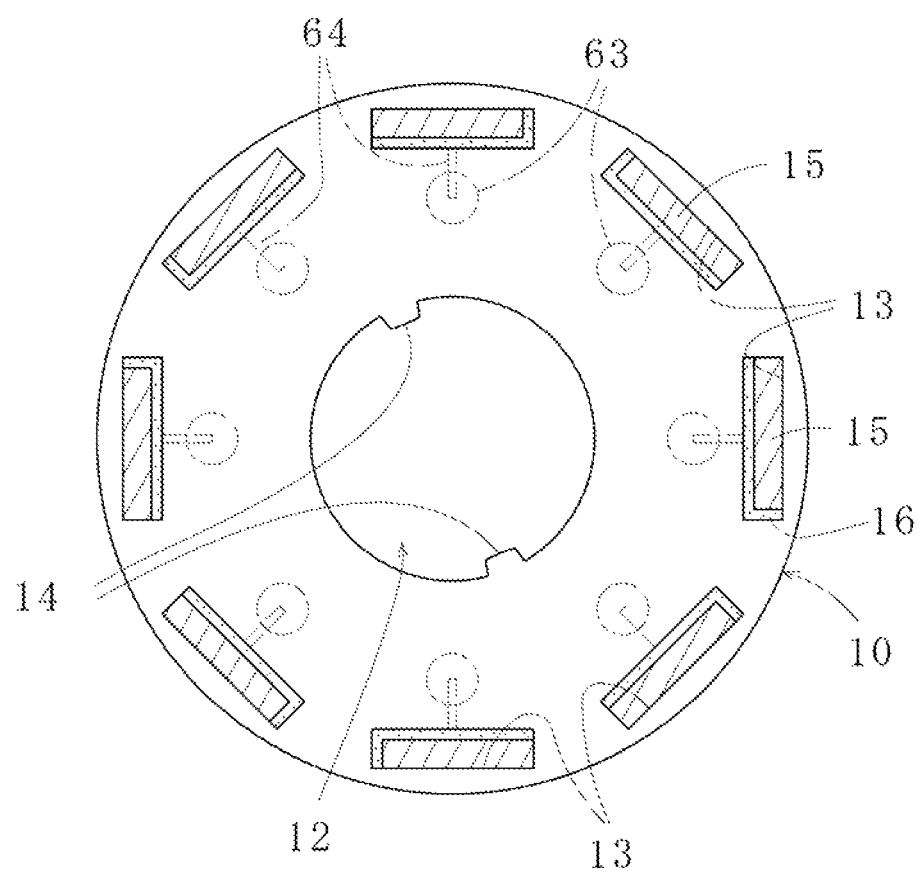
FIG. 6 is a plan view illustrating the core body to which the method of manufacturing a laminated rotor core according to the one embodiment of the present invention is applied.

As illustrated in FIG. 5, the resin sealing device 60 includes, for example, a lower die 61 for placing the carrier tray 40 on which the core body 10 is placed, and movable up and down, and an upper die 62 to be placed on the core body 10 and moving up as the lower die 61 moves upward. The upper die 62 has a plurality of resin reservoir pots 63 each containing a raw material of the resin material 16 (also known as a tablet) in a region radially inward with respect to the magnet insertion holes 13 of the core body 10, and resin passages (runners) 64, at a bottom of the upper die 62, for guiding the melted liquefied resin material 16 into the magnet insertion holes 13. FIG. 6 shows the resin reservoir pots 63 and the resin passages 64 by imaginary lines (alternate long and two short dashed lines). The resin reservoir pots 63 are provided so as to penetrate vertically through the upper die 62. Specifically, the resin reservoir pots 63 extend down to a bottom surface (a surface to be brought into contact with the upper surface of the core body 10) of the upper die 62.

Further, the resin sealing device 60 includes a fixing frame 65 fixedly disposed with a gap as a work space for injecting the resin material 16 from the upper die 62 at a lower limit position, a plurality of plungers 66 penetrating through the fixing frame 65 and applying a pressure to the resin material 16 in the respective resin reservoir pots 63 of the lifted upper die 62, and a stopper 67 for holding the upper die 62 when lifted at the upper limit position.

The fixing frame 65 is attached to an upper fixing plate 68, and the lower die 61 is placed on an elevating plate 71 that moves up and down along four guide posts 70 connecting the upper fixing plate 68 and a lower fixing plate 69. Here, heating means (not depicted) is provided within the fixing frame 65 to previously heat the plungers 66 to facilitate extrusion of the resin material 16, and to eliminate a difference of thermal expansion between the fixing frame 65 and the upper die 62, thereby eliminating position displacement and eccentricity of the plungers 66 and the resin reservoir pots 63.

The elevating plate 71 is configured to move up and down by lifting means of a lower die (e.g., jack) 72 provided on the lower fixing plate 69. Further, the plungers 66 inserted into the respective resin reservoir pots 63 are configured to move up and down through the resin reservoir pots 63 at the same timing by driving means for plungers 73 provided on the upper fixing plate 68.

The core body 10 placed between the upper die 62 and the lower die 61 of the resin sealing device 60 thus configured is pressed between the upper die 62 and the lower die 61, and the raw material of the resin material 16 in the resin reservoir pots 63 is heated by the upper die 62 to be liquefied. Then, the liquefied resin material 16 is extruded from the resin reservoir pots 63 by the plungers 66, and injected into the respective magnet insertion holes 13 through the resin passages 64. At this time, the liquefied resin material 16 extruded from the resin reservoir pots 63 is injected to the magnet insertion holes 13 through the resin passages 64, that is, through between the bottom of the upper die 62 and the front surface (upper surface) of the core body 10.

Figure 7A:
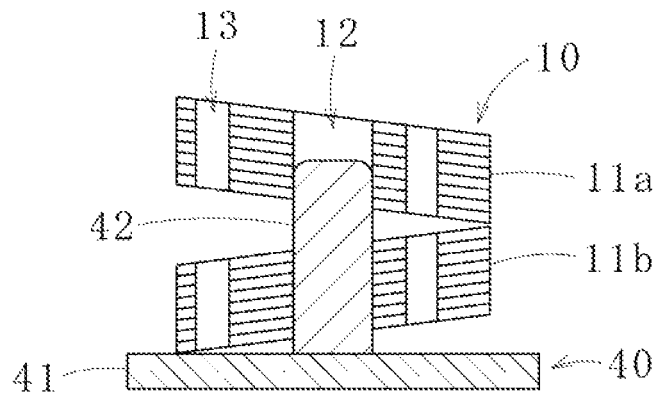
FIG. 7A, FIG. 7B and FIG. 7C are a schematic sectional view of the core body and the carrier tray having shapes different from those in FIG. 2 after the mounting step, a schematic sectional view of the core body and the carrier after the inserting step, and a schematic sectional view of the core body and the carrier in the injecting step, in the method of manufacturing a laminated rotor core according to the one embodiment of the present invention.
Figure 7B:
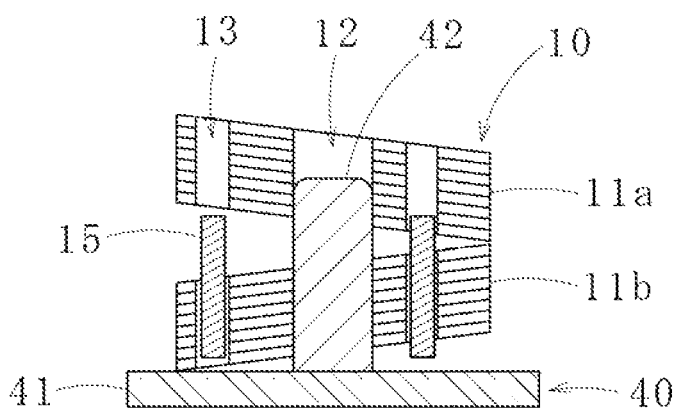
Figure 7C:
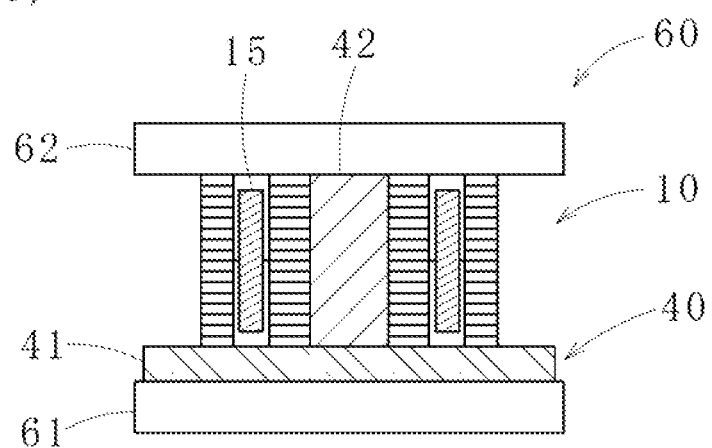
Figure 8:
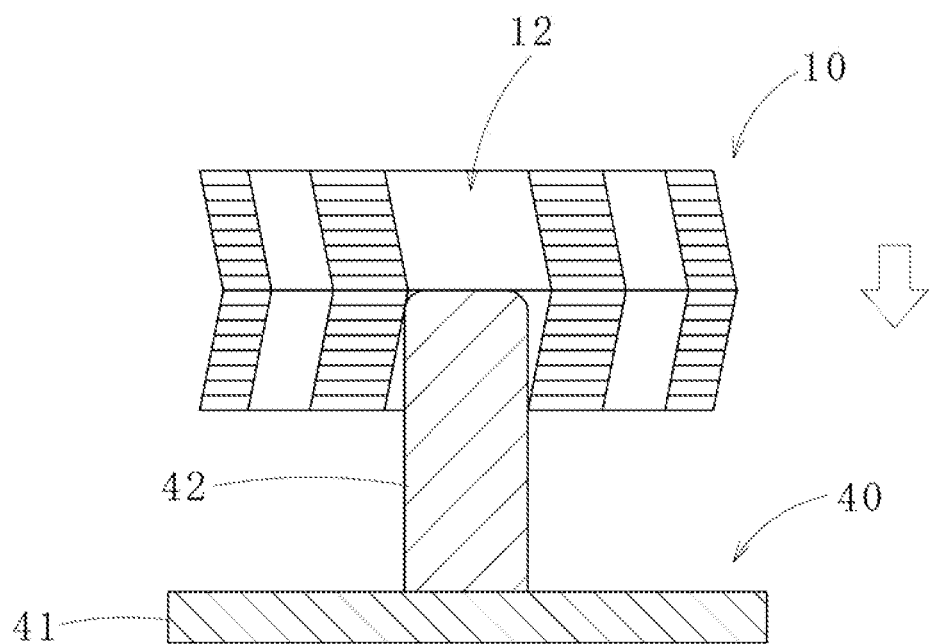
FIG. 8 is an illustrative view of a mounting step in a conventional method of manufacturing of a laminated rotor core.

As described above, in this step, as schematically illustrated again in FIGS. 7A to 7C, the core body 10 is pressed between the upper die 62 and the lower die 61 and the resin material 16 is injected into the magnet insertion holes 13 using the resin sealing device 60 (see FIG. 7C). Therefore, even when squareness and such of the blocks 11a and 11b that constitute the core body 10 is poor, it is possible to improve squareness and such by the pressure from the upper die 62 and the lower die 61. Further, while the fitting of the guide member 42 into the shaft hole 12 and the insertion of the permanent magnets 15 into the magnet insertion holes 13 become difficult when squareness and such of the blocks 11a and 11b is poor, as the core body 10 is preheated to increase the diameters of the holes according to the method of manufacturing a laminated rotor core of the embodiment, the fitting of the guide member 42 (see FIG. 7A) and the insertion of the permanent magnet 15 (see FIG. 7B) are possible.

It is preferable that the temperature of the core body 10 when the resin material 16 is injected, is equal to the temperature of the core body 10 in the preheating by the preheating device 51, or higher or lower in a range of ±20° C. With this, for example, it is possible to efficiently perform the liquefaction, the injection, and the curing of the resin material 16, and to prevent deformation of the core body 10.

(Curing Step)

In this step, the resin material 16 that has been injected into the magnet insertion holes 13 is cured by being heated. The curing is performed continuously from the injecting step by the heating means provided on the upper die 62 and the lower die 61 of the resin sealing device 60. At this time, as the core body 10 is preheated as described above, it is possible to cure the resin material 16 in a shorter period of time by further heating the core body 10 in which the resin material 16 is injected. The resin material 16 may be heated by a heating device different from the resin sealing device 60.

(Cooling Step)

Next, the carrier tray 40 and the core body 10 in which the resin material 16 is injected in the magnet insertion holes 13 and cured are carried along the carrier rail 50, and the core body 10 and the carrier tray 40 are cooled by a cooling device (e.g., spot cooler). The cooling may be natural cooling, instead of using the cooling device. After the cooling, the resin material 16 that has run off the magnet insertion holes 13 and been cured on the front surface of the core body 10 is removed. By polishing the front surface of the core body 10 from which the resin material 16 has been removed as needed, a laminated rotor core may be obtained. If the thickness of the laminated rotor core is the desired thickness, a corrosion inhibitor is sprayed on a front surface of the laminated rotor core, and the laminated rotor core is shipped out as a product. The removal of the resin material 16 that has run off the magnet insertion holes 13 and been cured may be performed before the cooling.

On the other hand, the carrier tray 40 that has been cooled along with the core body 10 may be repeatedly used by separating from the core body 10 and again used in the mounting step. At this time, while the carrier tray 40 is cooled preferably down to room temperature, there is a case in which the carrier tray is cooled insufficiently down to about 40-50° C., for example, and the diameter of the guide member 42 remains slightly expanded. However, according to the method of manufacturing a laminated rotor core of this embodiment, the diameter of the shaft hole 12 of the core body 10 and the like is expanded in the first preheating step, it is possible to fit the guide member 42 smoothly in the shaft hole 12, and to improve productivity.

The present invention is not limited to the embodiment described above, and may be altered or make addition to its configuration without departing from the spirit of the present invention. For example, it is possible to provide a heat insulating material that surrounds the core body with a gap therebetween on the mount plate of the carrier tray. In this case, the heat insulating material becomes circular and tubular, and this allows heat-retention of the core body. The heat insulating material may be configured in a removable manner. It is also possible to provide a guiding unit centering the guide member on the mount plate to position the circular and tubular heat insulating material.

Further, while the carrier tray 40 is used repeatedly after the cooling step according to the embodiment described above, the guide member may remain fitted into the shaft hole after the cooling step and the guide member and the mount plate may be separated. With this, it is possible to use the guide member as the shaft of the laminated rotor core. In this case, it is desirable that the diameter difference (gap) between the guide member and the shaft hole at room temperature is small (e.g., no smaller than 0 μm and no larger than 1 μm) or that the diameter of the guide member is larger. Here, the guide member protrudes upward and downward from the core body, and the upper die is preferably provided with a space for accommodating the guide member that protrudes upward from the core body. Further, when the guide member protrudes downward from the core body, it is possible to provide a configuration such that (1) the guide member that protrudes downward from the core body is accommodated in the mount plate, and that (2) if the length of the guide member that protrudes downward from the core body is greater than an entire thickness of the mount plate, it is possible to provide an escaping hole in the lower die.

In addition, the resin material to be injected is not limited to the thermosetting resin as long as the resin is curable, and may be a two-component curing type resin, for example. In this case, the heating after the injection of the resin material into the magnet insertion holes is not essential, and the resin material may be naturally cured.

DESCRIPTION OF NUMERALS

10: core body, 11a, 11b: block, 12: shaft hole 13: magnet insertion hole, 14: baffle, 15: permanent magnet, 16: resin material, 20: hot plate, 30: preheating fixture, 31: mounting table, 32: column portion, 33: disc plate, 34: leg portion, 35: grooved portion, 40: carrier tray, 41: mount plate, 42: guide member, 50: carrier rail, 51: preheating device, 52: lower heating part, 53: fixing frame, 54: lifting device, 55: upper heating part, 56: side heating part, 60: resin sealing device, 61: lower die, 62: upper die, 63: resin reservoir pot, 64: resin passage, 65: fixing frame, 66: plunger, 67: stopper, 68: upper fixing plate, 69: lower fixing plate, 70: guide post, 71: elevating plate, 72: lifting mean of a lower die, 73: driving means for plungers

What is claimed is:

1. A method of manufacturing a laminated rotor core, the method comprising:
    a mounting step of placing a core body on a carrier tray, the core body having a plurality of core sheets that are laminated on each other and having a shaft hole provided in the center of the core body and a plurality of magnet insertion holes provided around the shaft hole, the carrier tray having a mount plate and a columnar guide member standing on a front surface of the mount plate, the placement of the core body being carried out by fitting the guide member into the shaft hole;
    an inserting step of inserting permanent magnets respectively in the magnet insertion holes;
    an injecting step of injecting a liquefied resin material in each of the magnet insertion holes; and
    a first preheating step of heating the core body before the mounting step, wherein
    the mounting step, the inserting step, and the injecting step are carried out in the stated order, and
    the inserting step and the injecting step are carried out in a state in which the core body is placed on the carrier tray.

2. The method of manufacturing a laminated rotor core according to claim 1, wherein
    in the mounting step, a temperature of the core body is equal to or higher than that of the carrier tray.

3. The method of manufacturing a laminated rotor core according to claim 1, wherein
    in the inserting step, a temperature of the core body is equal to or higher than that of the permanent magnets.

4. The method of manufacturing a laminated rotor core according to claim 1, further comprising:
    a second preheating step of heating the core body between the inserting step and the injecting step.

5. The method of manufacturing a laminated rotor core according to claim 1, further comprising:
    a curing step of curing the resin material injected into the magnet insertion holes by heating the resin material; and
    a cooling step of cooling the carrier tray after the curing step, wherein the carrier tray cooled in the cooling step is repeatedly used.

6. The method of manufacturing a laminated rotor core according to claim 1, wherein
the core body is constituted from a plurality of blocks, each block including a plurality of the core sheets, the plurality of blocks being stacked in an axial direction of the shaft hole.

7. The method of manufacturing a laminated rotor core according to claim 1, wherein
one of a heating furnace, a band heater, a rubber heater, and a hot plate is used for heating in the first preheating step.

8. The method of manufacturing a laminated rotor core according to claim 7, wherein
the hot plate and a preheating fixture placed on the hot plate are used for heating in the first preheating step,
the preheating fixture includes a mounting table for placing the core body, and a column portion extending higher than a front surface of the mounting table and to be inserted into the shaft hole of the core body,
the core body is in a columnar shape, and
a distance from the center of the column portion to an outer edge on the front surface of the mounting table is smaller than a radius of the core body.

9. The method of manufacturing a laminated rotor core according to claim 1, wherein
the guide member and the mount plate of the carrier tray are configured such that the guide member and the mount plate may be separated from each other after the injecting step.

10. The method of manufacturing a laminated rotor core according to claim 9, wherein
the guide member is directly used as a shaft of the laminated rotor core.

11. The method of manufacturing a laminated rotor core according to claim 1, wherein
in the mounting step, a temperature of the core body is higher than that of the carrier tray by 20° C. or less.

12. The method of manufacturing a laminated rotor core according to claim 1, wherein
in the inserting step, a temperature of the core body is higher than that of the permanent magnets by 20° C. or less.

13. The method of manufacturing a laminated rotor core according to claim 1, wherein
in the mounting step, a temperature of the core body is higher than that of the carrier tray.

14. The method of manufacturing a laminated rotor core according to claim 1, wherein
in the inserting step, a temperature of the core body is higher than that of the permanent magnets.

15. The method of manufacturing a laminated rotor core according to claim 1, wherein
in the first preheating step, the core body is heated to a temperature of 50° C. to 200° C.

16. The method of manufacturing a laminated rotor core according to claim 4, wherein
a heating temperature of the second preheating step is higher than that of the first preheating step.

* * * * *